United States Patent [19]

Mutoh et al.

[11] Patent Number: 5,686,883
[45] Date of Patent: Nov. 11, 1997

[54] VEHICLE ANTI-THEFT SYSTEM

[75] Inventors: Eiji Mutoh; Shinichi Kubota; Susumu Maeda; Suguru Asakura; Akira Nagai, all of Wako, Japan

[73] Assignee: Honda Giken Kogyo Kabushiki Kaisha, Tokyo, Japan

[21] Appl. No.: 461,422

[22] Filed: Jun. 5, 1995

[30] Foreign Application Priority Data

Oct. 19, 1994 [JP] Japan ..................... 6-278572
Feb. 8, 1995 [JP] Japan ..................... 7-042578

[51] Int. Cl.⁶ ..................... B60R 25/10
[52] U.S. Cl. ........... 340/426; 307/10.2; 307/10.6; 180/287
[58] Field of Search ........... 340/426; 364/424.01; 307/10.5, 10.2, 10.3, 10.4, 10.6; 180/287

[56] References Cited

U.S. PATENT DOCUMENTS

| | | | |
|---|---|---|---|
| 4,291,237 | 9/1981 | Kitano | 307/10.3 |
| 4,366,466 | 12/1982 | Lutz | 307/10.5 |
| 4,736,113 | 4/1988 | Leu | 307/10.5 |
| 4,749,873 | 6/1988 | Mutoh et al. | |
| 4,965,460 | 10/1990 | Tanaka et al. | 307/10.2 |
| 5,254,842 | 10/1993 | Posner et al. | 307/10.2 |
| 5,519,376 | 5/1996 | Iijima | 307/10.3 |

FOREIGN PATENT DOCUMENTS

| | | |
|---|---|---|
| 0 372 741 | 6/1990 | European Pat. Off. |
| 0 618 113 | 10/1994 | European Pat. Off. |
| 44 12 214 | 10/1994 | Germany. |
| 43 38 033 | 5/1995 | Germany. |
| 43 41 333 | 6/1995 | Germany. |
| 44 07 966 | 9/1995 | Germany. |
| 44 13 922 | 10/1995 | Germany. |
| 125653 | 12/1991 | Japan. |
| 2023897 | 1/1980 | United Kingdom. |
| 2046827 | 11/1980 | United Kingdom. |
| 2071377 | 9/1981 | United Kingdom. |
| 81/03002 | 10/1981 | WIPO. |

*Primary Examiner*—Jeffery Hofsass
*Assistant Examiner*—Edward Lefkowitz
*Attorney, Agent, or Firm*—Pollock, Vande Sande & Priddy

[57] ABSTRACT

A vehicle anti-theft system in which, only when the ID signal is obtained from a right ignition key and when the vehicle anti-theft function is halted by the failure of an anti-theft circuit or theft detection unit itself, the start-up of the engine is permitted. The system comprises a unit for generating a start-up enable signal in response to a verification signal representing a right ID signal, and an engine control unit for performing the start-up control of the engine in response to the start-up enable signal and disabling the engine in response to a theft signal. The start-up enable signal generating unit generates a start-up enable signal in response to the fault signal. A dummy line for detecting a breakage is wired along various signal lines wired on the substrate of an immobilizer, which, if intentionally broken by an ill-intentioned third party, could cause a fault signal similar to that for the failure of the immobilizer to be outputted from a determination signal output terminal. If a break in the dummy line is detected, the engine control is inhibited even if the fault signal is detected.

23 Claims, 11 Drawing Sheets

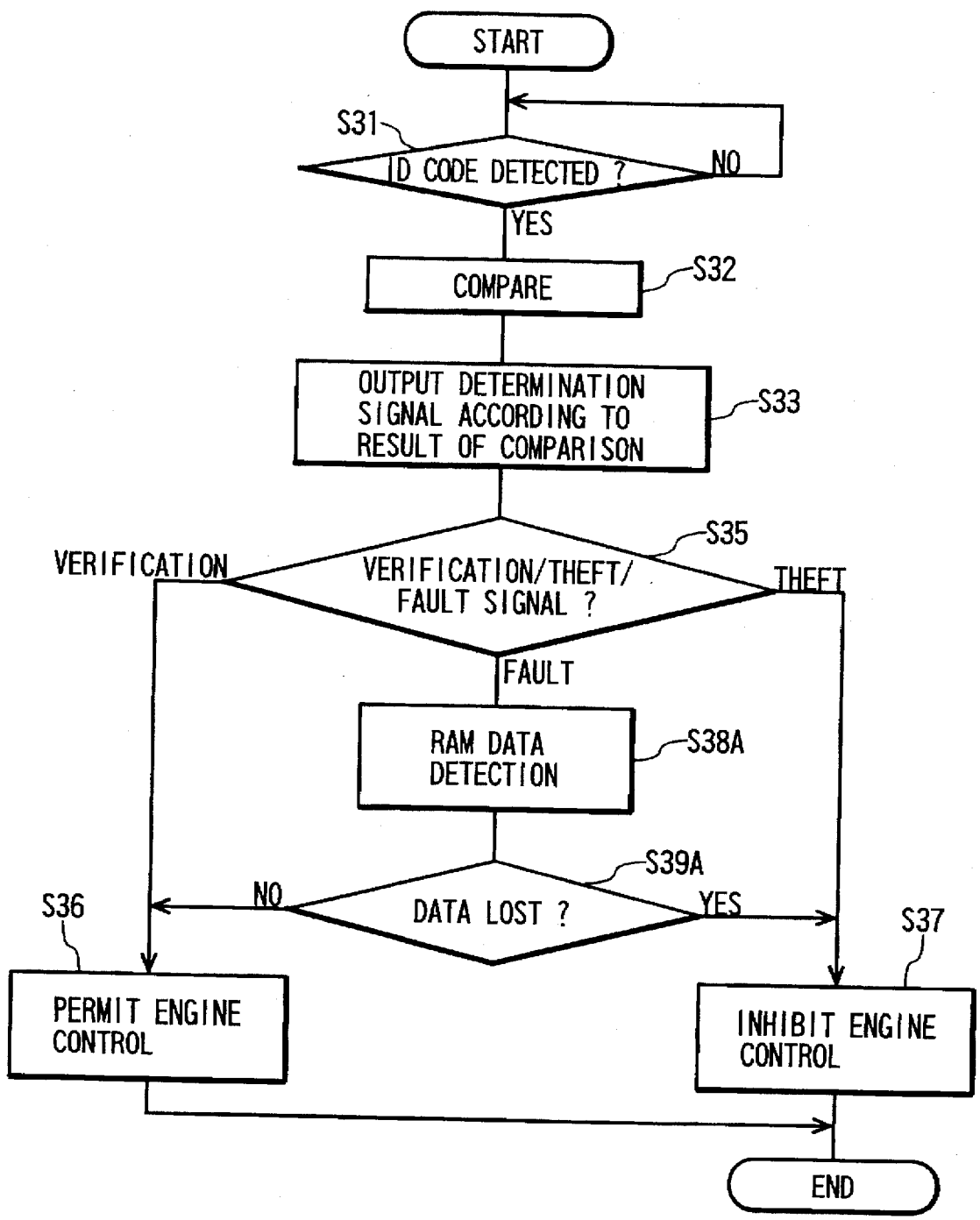

VEHICLE ANTI-THEFT SYSTEM

BACKGROUND OF THE INVENTION

1. Field of the Invention

The present invention is related to a vehicle anti-theft system, and particularly to a vehicle anti-theft system in which the addition of an anti-theft function to the engine control circuit for controlling a vehicle can be served only by a minimum change in the control circuit pattern.

The present invention is further related to a vehicle anti-theft system which enables a start-up of an engine on condition that an ID code previously registered in the engine key or the like and another ID code previously registered on a vehicle body satisfy a predetermined relationship with each other.

2. Description of the Prior Art in some of the various proposals for preventing the theft of a vehicle such as a car, the vehicle is prevented from being started up or it is immobilized by mechanical and/or electrical means when it is attempted to be started up or moved using of a wrong ignition key. This is achieved by previously storing an identification code or a key ID code in a key, reading the key ID code when the key is inserted into a key cylinder to start up the vehicle, comparing it with a reference ID code prestored in the vehicle side, generating an enable signal only when there is a match between both ID code, and enabling the engine to be started up only when an engine control unit successfully receives that signal. In this case, since a theft may be committed by mechanical breakage or illegal wiring if the enable signal is a binary signal of on/off, the encoding of the enable signal has been proposed, for instance, in the "Car Technology", Vol. 48, No. 8, 1994, pp. 59-64.

An example of such conventional transponder type immobilizer is shown in FIG. 6. An ignition key 2 includes a memory (not shown) in which a key ID code (for instance, of 64 bits) is prestored, and a transmitter 4 for transmitting the key ID code. The transmitter 4 of the key 2 and a key cylinder 5 are coupled together by, for instance, an induction coil (antenna) 6. When the key 2 is inserted into the key cylinder and rotated to the ignition position, an ignition switch 7 is closed. In response to this, an immobilizer CPU 13 operates, and operating electric power is supplied from a power amplifier 11 of an immobilizer 10 to the transmitter 4 through the coil (antenna) 6. The transmitter 4 responds to this to read the key ID code, and transmits it to the key cylinder 5 side.

The received key ID code is detected and digitized by a R/F (radio frequency) circuit 12 in the immobilizer 10, and read into the CPU 13 and temporarily stored in an appropriate ID code register 13B in the CPU 13. In an EEPROM 13A of the CPU 13, a unique reference ID code assigned to each vehicle is prestored, and the reference ID code and the key ID code which was read in are compared with each other by a compare unit 13S of the CPU 13. If it is determined that there is a match between the two or they are in a predetermined relationship, an enable code is transmitted from the compare unit 13S to an engine control unit (ECU) 16. At the same time, a starter relay 15 is activated to initiate the rotation of a starter motor (not shown).

When the ECU 16 completes the determination and verification of the reception of the enable code, it controls a fuel injection valve 17, a fuel pump 18, an ignition control unit 20, etc. according to a predetermined procedure and timing, thereby enabling the vehicle to start up and run. On the other hand, if the reference ID code stored in the EEPROM 13A and the key ID code transmitted from the key 2 and read in do not match each other or they are not in a predetermined relationship, the compare function unit 13S does not issue an enable code. Accordingly, the start of the vehicle by the ECU 16 is inhibited, and a horn 14 is activated by the CPU 13 to provide an appropriate alarm and display. Thus, an illegal start-up and running of the engine by a wrong ignition key is prevented, thereby ensuring the prevention of a vehicle theft.

in the Japanese Patent Application Kokai No. 62-88644 official gazette, for instance, a proposal is made for comparing a bar code stored in the ignition key with a code previously stored in the anti-theft circuit on the car body, and generating a start-up (start-up enable) signal to enable the engine control ECU if the two codes match each other, but, generating no start-up signal or generating a start-up disable signal if they do not match each other.

in the above described prior art, only when it is determined that the ID signal obtained from the ignition key or the like is right or valid, the start-up of the engine is permitted, otherwise it is prohibited. There is a problem, therefore, that the start-up of the engine and the driving of the vehicle cannot be performed because the generation of a start-up (start-up enable) signal is prevented by the failure of the anti-theft circuit itself (such as a breaking or short-circuit of the circuit wiring) regardless of a start-up operation using a right ignition key.

SUMMARY OF THE INVENTION it is the object of the present invention to provide a vehicle anti-theft system in which, when it is detected that the vehicle anti-theft function is disabled or impaired by the failure of the anti-theft circuit or theft detection unit itself, the start-up of the engine and the driving of a vehicle are enabled without the verification signal from the theft detection unit.

The vehicle anti-theft system according to the present invention comprises: a theft detection unit for discriminating whether or not the signal supplied to the input thereof is an ID signal representing a right start-up operation, and generating a verification signal if it is a right ID signal, while generating a theft signal if it is not; a start-up enable signal generating means for generating a start-up enable signal in response to the verification signal; and an engine control unit for performing the start-up control of the engine in response to the start-up enable signal and disabling the start-up control of the engine in response to the theft signal.

The theft detection unit generates a fault signal when this unit itself does not operate normally, and the start-up enable signal generating means generates a start-up enable signal in response to the fault signal. The verification signal may be a pulse having a predetermined frequency and duty ratio, the fault signal may be a d.c. signal of a high level, and the theft signal may be a d.c. signal of a reference (ground) level. The verification signal, theft signal and fault signal are connected to the input port of the engine control unit by one signal line.

The theft detection unit generates a verification signal when it judges that the signal supplied to its input is an ID signal representing a right start-up operation, thereby causing a start-up enable signal to be generated for enabling the start-up of the engine and the driving of the vehicle by the engine control unit, whereas it disables the engine start-up by the engine control unit when it judges that the signal is not a right ID signal. When the operation of the theft detection unit itself is not normal, the level of input signal from the theft detection unit to the engine control unit is fixed to a predetermined value to enable the start-up of the engine and the driving of the vehicle.

BRIEF DESCRIPTION OF THE DRAWING

FIG. 12 is a flowchart showing the operation of the fourth embodiment.

DETAILED DESCRIPTION OF THE PREFERRED EMBODIMENT

Figure 1:
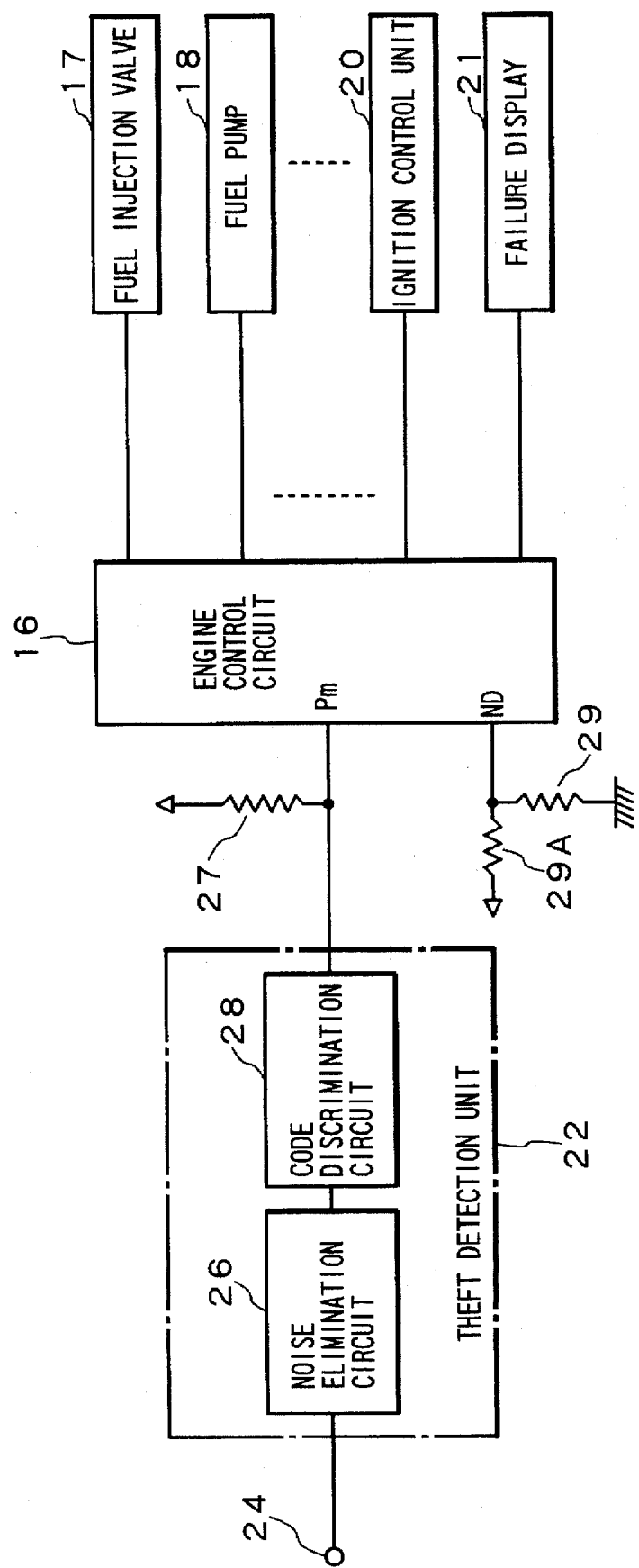
FIG. 1 is a block diagram showing an embodiment of the present invention.
Figure 2:
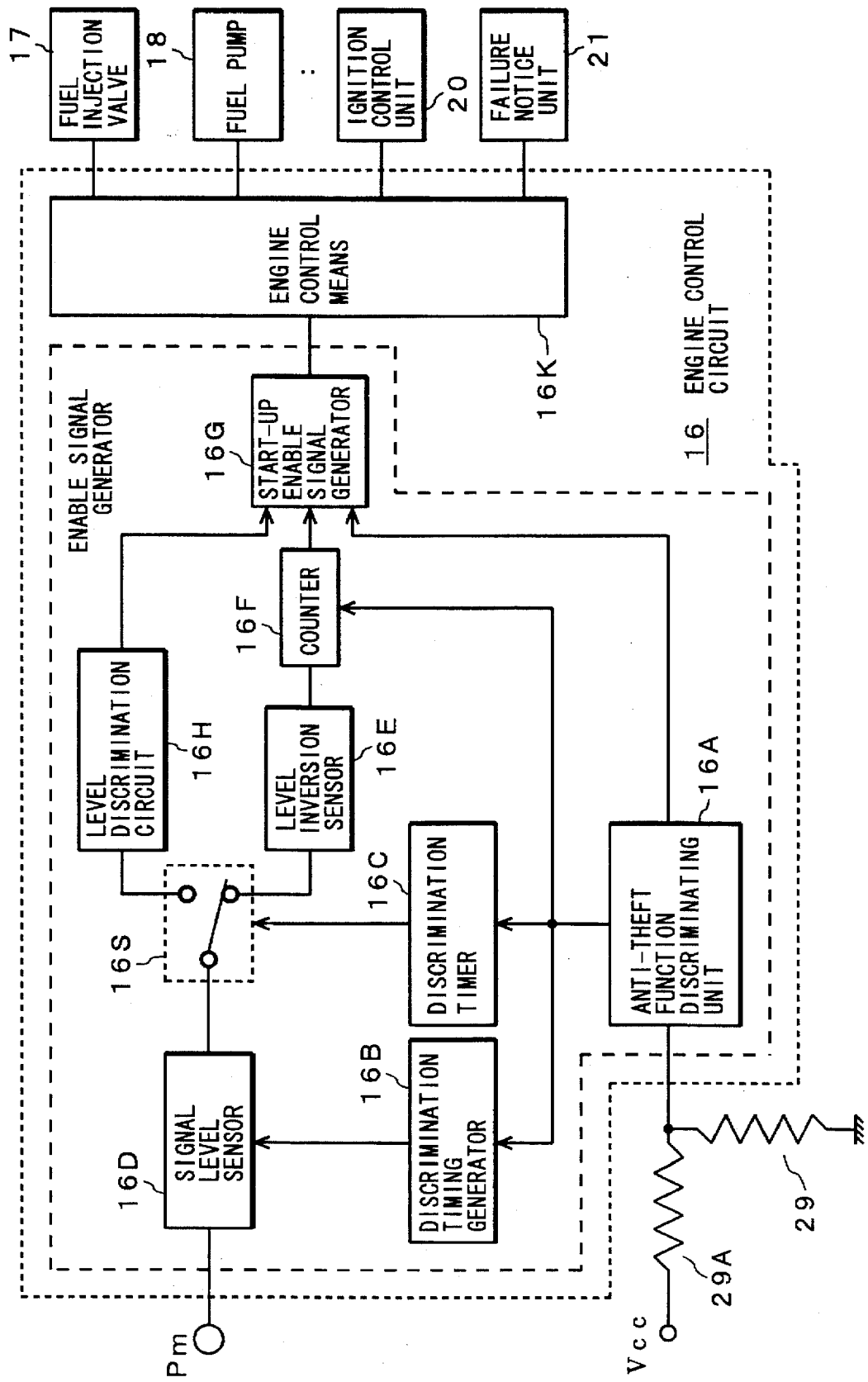
FIG. 2 is a functional block diagram showing the primary construction of the embodiment of the present invention.

FIG. 1 is a block diagram showing an embodiment of the present invention, and FIG. 2 is a functional block diagram showing the primary construction of the engine control circuit shown in FIG. 1. In these figures, symbols that are the same as those in FIG. 6 represent the same or identical portions.

Figure 6:
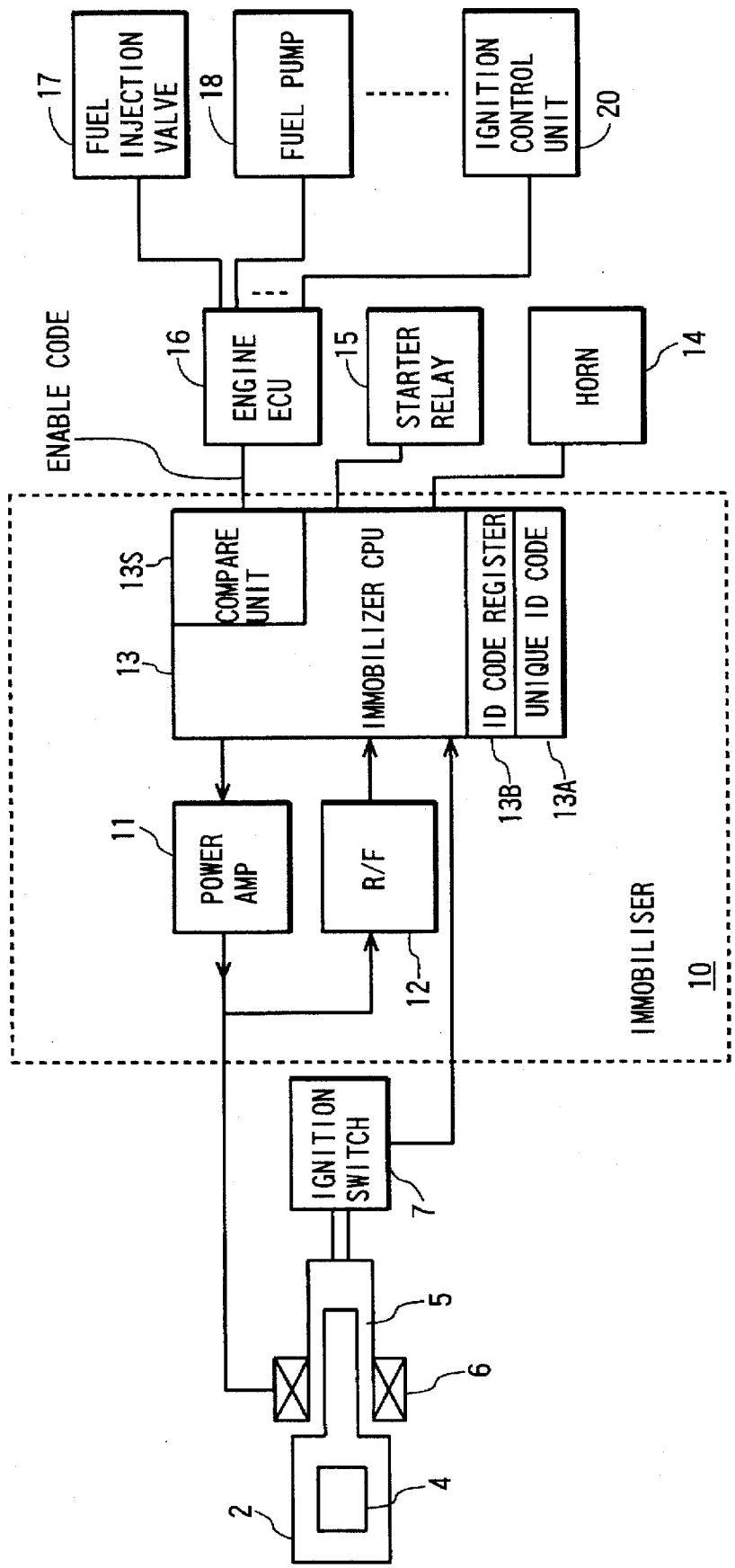
FIG. 6 is a block diagram showing the conventional vehicle anti-theft system.

The enable code described with reference to FIG. 6 is supplied to a noise elimination circuit 26 from the input terminal 24 of a theft detection unit 22 in FIG. 1, subjected to a noise elimination, and thereafter transferred to a code discrimination circuit 28. Then, if the enable code is recognized to be right, for instance, by comparison with a reference code prestored in the code discrimination circuit 28, the code discrimination circuit 28 supplies a verification (pulse) signal of a predetermined known frequency and duty ratio to the input port Pm of an engine control circuit 16. In this embodiment, the verification signal is a pulse whose duty ratio is 0.5, and output when no right enable code is inputted is a d.c. signal of a low (ground or reference) voltage level, that is a theft signal. Further, since the input port Pm is pulled up to an operation voltage Vcc by a resistor 27, a voltage at the port Pm becomes a d.c. signal of a high level (or fault signal) if the theft detection unit 22 is put in an abnormal condition by a failure (such as a breaking or short-circuit of the wiring). It is well known that various voltage signals such as those described above can easily be formed by a microprocessor or the like.

The engine control circuit 16 discriminates whether or not the signal received at the Pm port is a verification (pulse) signal of a predetermined waveform, and whether or not the anti-theft system or the theft detection unit operates normally, and enables or disables the engine control operation of the engine control circuit 16 according to the discrimination result.

Although the respective waveforms of the verification signal, theft signal and fault signal may freely be set, the respective waveforms were set from the following viewpoints in the present embodiment. Taking into consideration that the microprocessor or CPU constituting the theft detection unit can generate a signal of a predetermined frequency and/or duty ratio only when the microprocessor or CPU operates normally, and that it is considered virtually impossible to generate a signal of the same frequency and duty ratio as the above described one by an illegal operation, the verification signal representing a right key operation was made to be a signal of a predetermined frequency and duty ratio.

In addition, since the output level of the microprocessor or CPU constituting the theft detection unit often becomes unstable and indefinite when the theft detection unit is faulty, the fault signal was made to be fixed to a high level by a pull-up resistor. Taking into consideration that the theft signal should be generated only when the theft detection unit operates normally, and that it can clearly be distinguished from the other two signals and all of the three signals can be connected to the engine control unit by one signal line, the theft signal was made to be a fixed low level voltage. Of course, the fault signal may be fixed to a low level using a pull-down resistor instead of the pull-up resistor, and the theft signal may be fixed to a high level.

Figure 3:
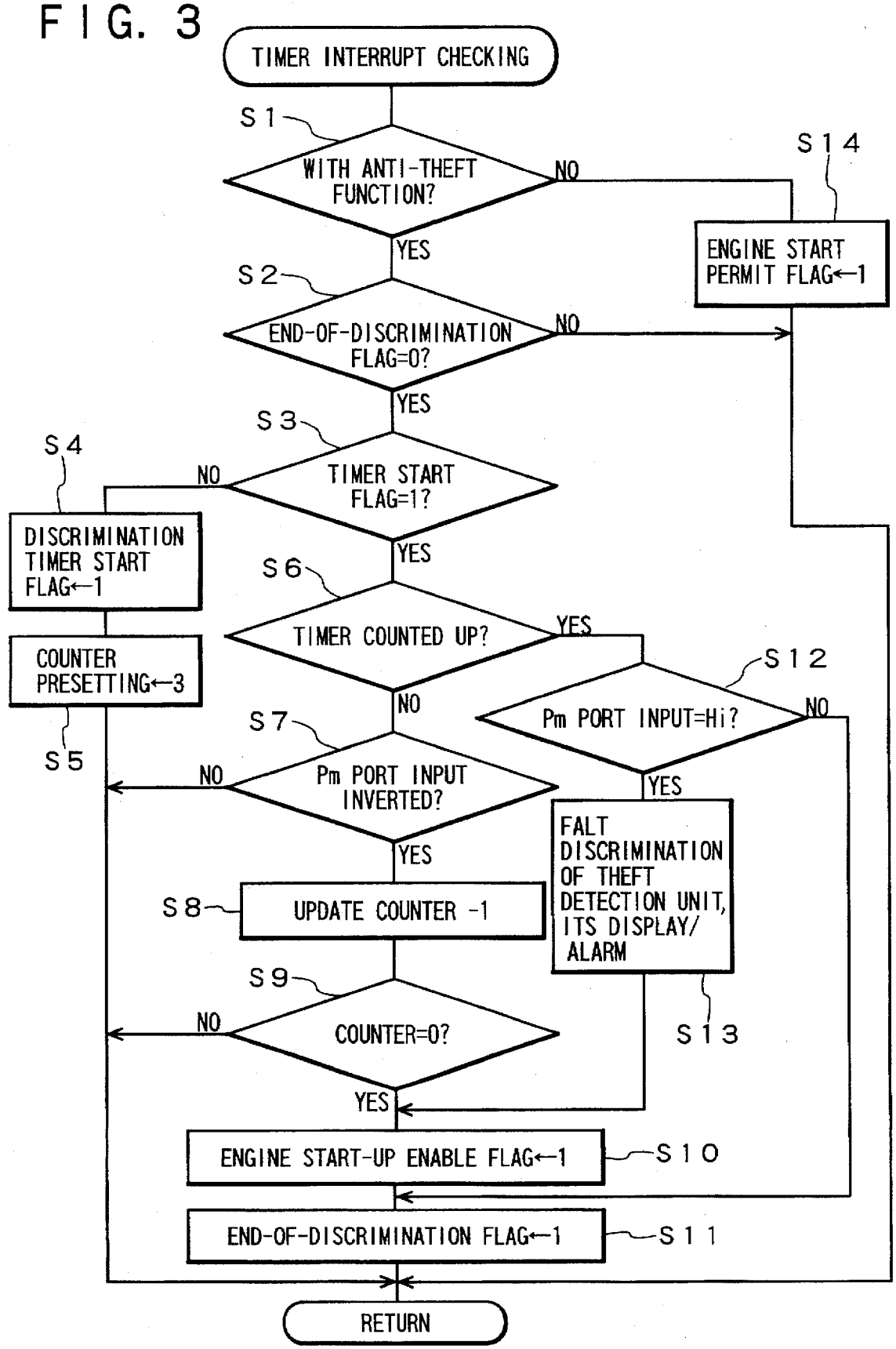
FIG. 3 is a flowchart showing the verification signal discrimination operation by the system of FIG. 2.

The verification signal discriminating operation of the engine control circuit 16 is described with reference to the functional diagram of FIG. 2 and the flowchart of FIG. 3. Since, in the experiment of the present inventors, a pulse having a period of about 44 ms and a duty ratio of 0.5 and performing a level inversion at every 22 ms was used as the verification signal, the verification signal discrimination process was determined to be performed, for instance, at every 10 ms by the timer interruption of the engine control circuit 16. The cycle of the timer interruption, or the sampling interval is determined by the relationship with the cycle of the verification (pulse) signal which is a signal to be detected. In general, from the well-known sampling theorem, it is only required that the interrupt cycle be equal to or shorter than ½ of the pulse cycle.

in step S1 in FIG. 3, it is determined, based on the divided voltage by voltage dividing resistors 29 and 29A, whether or not the vehicle in question is equipped with an anti-theft function, and if equipped, what the class of its specification is, in other words, what the destination of the particular vehicle is. However, since the present invention is not pertinent to determination of the destination, the description is made here on the assumption that only the provision of the anti-theft function is to be determined. For instance, if the divided voltage is 0 V, it is determined that the anti-theft function is not provided, and if it is 4 V, it is determined that the anti-theft function is provided. In FIG. 2, this determination is made in a unit for discriminating the provision of an anti-theft function 16A. If it is determined that there is no anti-theft function, the process goes to step S14 to set an engine start-up enable flag to "1". In FIG. 2, the anti-theft function discriminating unit 16A enables a start-up enable signal generator circuit 16G to cause an engine control unit 16K to perform an engine start-up control.

if it is determined in step S1 that there provided an anti-theft function is provided, it is discriminated in step S2 whether or not an end-of-discrimination flag is 0, or if a discrimination time has not expired yet. The determination time will be described in detail later. In FIG. 2, this discrimination corresponds to whether or not the discrimination timer 16C has timed up to generate an output. First, the end-of-discrimination flag is 0, and thus the process goes to step S9 to determine whether or not a discrimination timer start flag is 1 (that is, whether or not a timer for measuring the allowed discrimination period has been started). If the timer has not started yet, it is started and the timer start flag is set to "1" in step S4, and a counter is preset to a predetermined value (in this example, 3) in step S5. The process of FIG. 3 temporarily returns to the main routine (not shown), and the process of FIG. 3 is resumed by the next timer interruption.

These processes correspond to the operation in FIG. 2 in which the anti-theft function discriminating unit 16A initiates the discrimination timing generator 16B and the discrimination timer 16C, and presets a counter 16F to an initial value if it is determined that there provided the anti-theft function.

Since the all discriminations in steps S1 to S3 become positive in the subsequent processings, the process goes to step S6 to determine whether or not the time set in the discrimination timer 16C (in this example, 2.2 sec) has expired. Since it has not expired yet at the beginning, it is determined in step S7 whether or not the signal level received at an input port Pm of the engine control circuit 16 has inverted. This corresponds to the operation in FIG. 2 in which a signal level sensor 16D transfers the sensed level of the received signal to a level inversion sensor circuit 16E through a switch 16S in response to the output of the discrimination timing generator 16B, and the level inversion sensor circuit 16E detects the inversion. A level inversion can be sensed by temporarily storing the sensed level in the previous sampling and comparing it with the sensed level in the current sampling. The process returns to the main routine if no level inversion is sensed in step S7, whereas one is subtracted from the current count value in the counter in step S8 if a level inversion is sensed in FIG. 2, the output of the level inversion sensor 16E causes the count value in a counter 16F to be decremented by one.

In step S9, it is determined whether or not the count value in the counter is 0, and the process returns to the main routine if the discrimination is negative (the count value is not 0). Since the particular ignition key can be determined to be right if the count value becomes 0 while the above processings are repeated, the engine start-up enable flag is set to "1" in step S10 and the end-of-discrimination flag is set to "1" in step S11, terminating the signal discrimination operation.

On the other hand, since the discrimination in step S6 becomes positive if the discrimination in step S9 is not positive and hence the discrimination time expires while the end-of-discrimination flag is still zero, the process goes to step S12. This corresponds to the operation in FIG. 2 in which the discrimination timer 16C generates an output by its counting-up, whereby the switch 16S is switched from the shown position to the opposite side for a level discrimination circuit 16H.

In step S12, the level of the pulse signal received at the port Pm at that point of time is discriminated. Then, if it is of a high level, the process goes to step S13 to determine that the theft detection unit 22 is faulty and display according to that effect (and an alarm is made as necessary), and in step S10, the engine start-up enable flag is set to "1" to perform the engine start-up. On the other hand, if the received pulse signal is of a low level, it is determined that no enable signal has been received in the theft detection unit 22, or the ignition key operation is illegal, and the end-of-discrimination flag is set to "1" in step S11 to terminate the discrimination operation while keeping the engine start-up to be disabled. These processings correspond to the operation in FIG. 2 in which the output of the signal level sensor 16D is judged in the level discrimination circuit 16H and a start-up enable signal generator 16G is activated only when it has an input of a high level.

Since the discrimination in step S2 becomes negative if the end-of-discrimination flag is set to "1", the remaining processings in FIG. 3 are skipped. Thus, the start-up of the engine and the driving are allowed when a right ignition operation is performed or the theft detection unit 22 is faulty, but the start-up of the engine is inhibited for a wrong or an illegal key operation during an attempted theft or the like.

Figure 4:
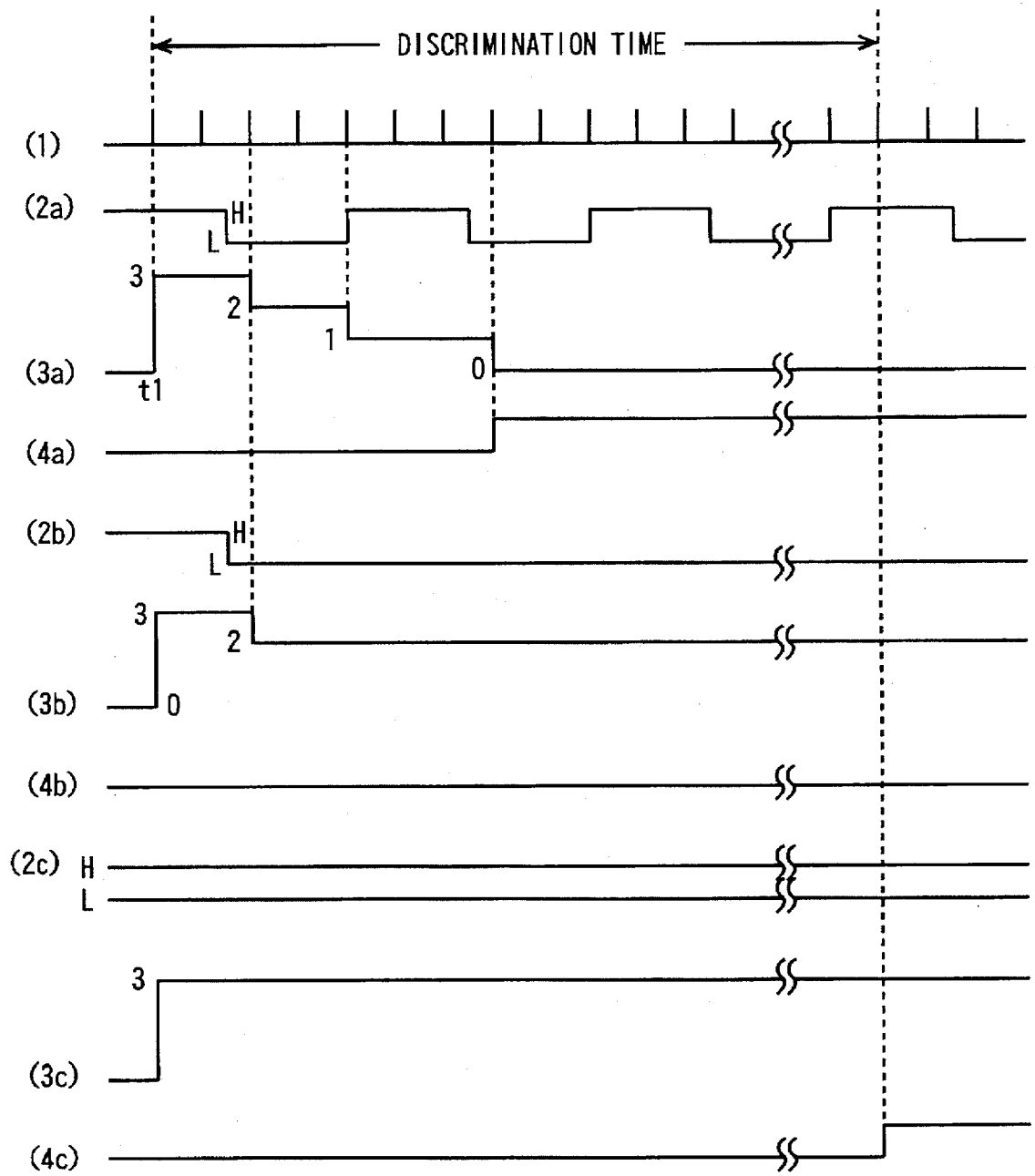
FIG. 4 is a time chart showing the verification signal discrimination operation by the system of FIG. 2.

FIG. 4 is a time chart for explaining the operation of the above described embodiment. At the timing shown in a waveform (1), the level detection of Pm port inputs (2a), (2b) and (2c) is performed. The input waveform (2a) is a signal input to the port Pm for the right key operation, (2b) is a signal at the port Pm for the wrong or illegal key operation, and (2c) is a signal at the port Pm when the theft detection unit 22 is faulty. Waveforms (3a), (3b) and (3c) represent how the count value of the counter 16F changes for the respective cases, and waveforms (4a), (4b) and (4c) represent the changes of the start-up enable flag for the respective cases. The details are self-obvious from the above description of FIGS. 2 and 3, and thus they are omitted.

Figure 5:
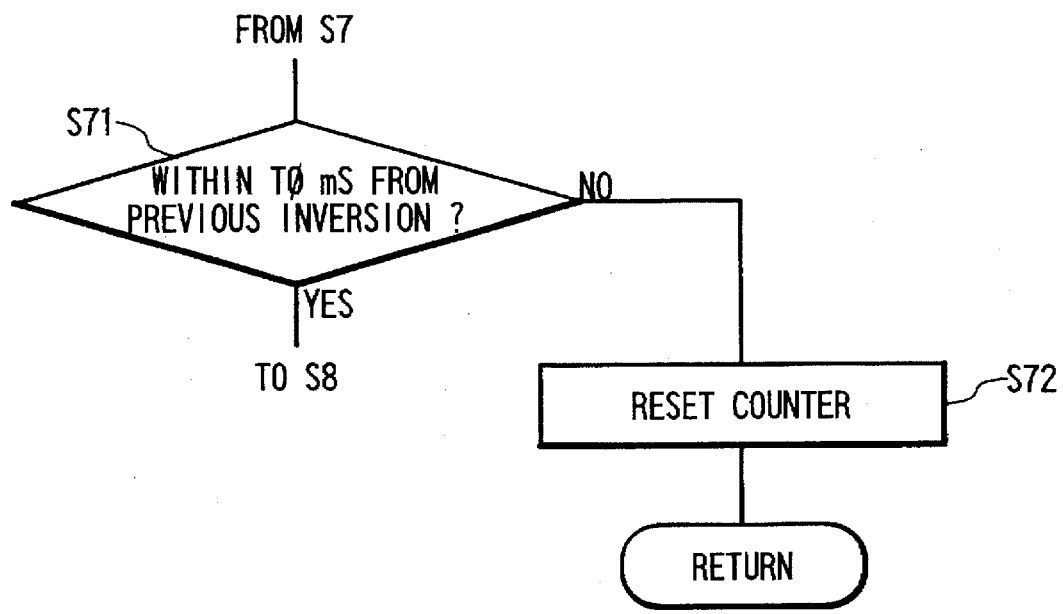
FIG. 5 is a figure showing the procedure to be added to the flowchart of FIG. 3 for the verification signal discrimination operation in a second embodiment of the present invention.
Figure 5A:
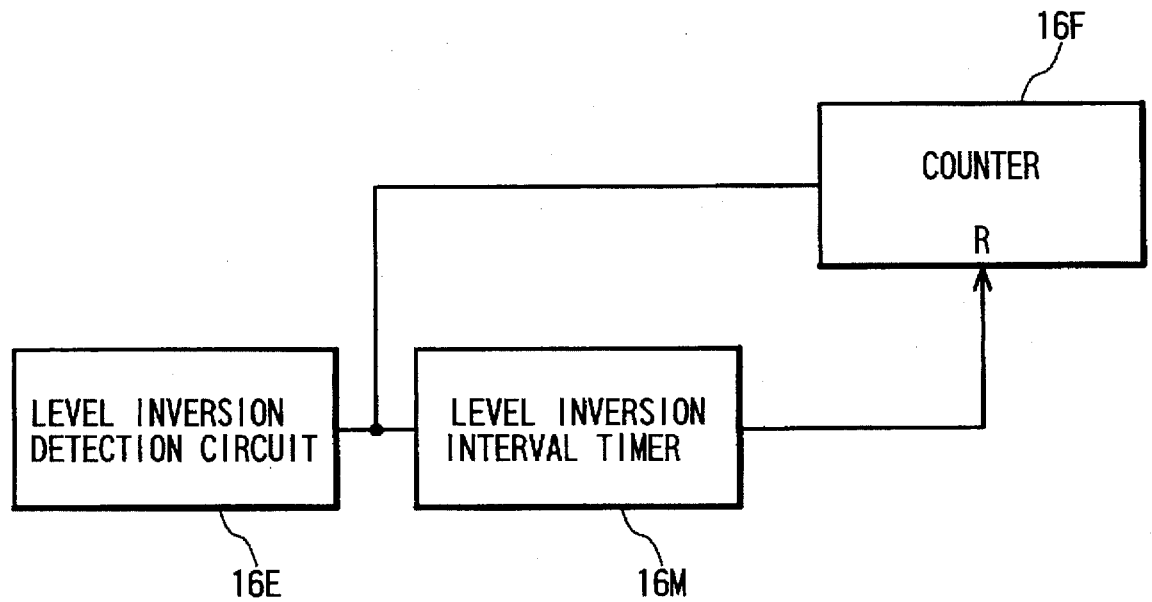
FIG. 5A is a block diagram showing the circuit blocks to be added to the construction of FIG. 2 in the second embodiment.

In the example in FIGS. 3 and 4, it is determined that the key operation is right if a predetermined number of level inversions are detected during a predetermined discrimination time, but, in this case, there may be a wrong discrimination due to inclusion of a noise of the like. As a the countermeasure against this it, it is preferred to add, as shown in FIG. 5A, a level inversion interval timer 16M for measuring the time from the preceding level inversion to the current level inversion and for resetting the counter 16F shown in FIG. 2, and as shown in FIG. 5, it is preferred to add, between step S7 and step S8 in FIG. 3, a procedure for determining whether or not the time from the preceding level inversion to the current level inversion is shorter than a preset time to ms (step S71), and when the determination is negative, to reset the counter 16F in step S72. The preset time TO ms is the maximum permissible time between two successive level inversions which occur in a normal verification signal, and it is ½ of the pulse cycle if the duty ratio of the pulse is ½.

Although, in the above description, the pulse signal reception is determined on the basis of the detection of three level inversions of the verification signal received at the port Pm, it will easily be understood that the number of level inversions may be other than three, for instance two or more than three. In addition, preferably, the theft detection unit 22 is removably provided with respect to the engine control circuit. In this case, by mounting the theft detection unit 22 in a vehicle having an anti-theft function, while avoiding the mounting of the theft detection unit 22 in a vehicle without an anti-theft function, an engine control circuit common to both vehicle types can be provided. In this case, since a high-level potential is always supplied to the port Pm in the vehicle without an anti-theft function, the engine is started up without any hitch as is apparent from the above description.

Although, in the above described embodiments, the theft detection unit 22 receives the enable signal from a separately provided immobilizer and performs a decoding and comparison of the signal, it should be understood that the theft detection unit itself may perform the detection, decoding and comparison of a key code ID, and generate an ID signal (verification signal) representing a right start-up operation, or a theft signal.

In accordance with the present embodiment, the verification signal and theft signal from the theft detection unit and the fault signal can be connected to the engine control circuit by only one signal line, and thus only a minimum change in the circuit pattern is required for adding the anti-theft function to the engine control unit (ECU), so that an increase of the cost can be avoided, and the reduction of number of terminals and miniaturization of an engine control unit can be achieved. When the engine start-up and running of the vehicle were enabled by a failure of the theft detection unit, a corresponding display (and/or alarm) appears to inform the driver of this condition for repair, and thus it is easy to keep the anti-theft function normal. If the theft detection unit is removable with respect to the control circuit board of the engine control unit, there is an advantage that the commonality of the specification of the engine control circuits (such as board construction and processing software) can be achieved regardless of whether or not a vehicle is equipped with the anti-theft system. Further, a vehicle already equipped with the anti-theft system can be served only by adding the anti-theft detection unit. In addition, in the manufacturing process, whether or not the anti-theft detection unit is already mounted can be identified only from the outward appearances, and thus the assembly works and inspections become simple and reliable.

In the above described respective embodiments, even if the immobilizer 10 is intentionally broken or removed from the ECU 30 by an ill-intentioned third party so that the output level of the determination signal line becomes unstable and indefinite, the "H"-level signal stabilized by the pull-up resistor is inputted to the engine ECU 16, and thus there was a problem that the engine ECU 16 erroneously recognized this as a fault signal to enable the engine control.

The third embodiment of the present invention is to disable the function which enables the start-up of the engine and the like upon the detection of the failure of the immobilizer ECU 10 itself even if a normal code signal cannot be detected, when the immobilizer ECU 10 is intentionally broken. Thus, this embodiment comprises a theft determination means for making a theft determination if an externally inputted ID code is not a valid ID code, a means for permitting the engine control unless the theft determination is not made, a destructive action detection means for detecting a destructive action on the theft determination means, and a means for inhibiting the engine control if the destructive action is detected.

In accordance with the above characteristics, even if a fault determination is outputted without making a theft determination, the engine control is not promptly permitted, but it is detected whether or not the theft determination means has suffered from a destructive action. Since the engine control is inhibited if a destructive action is recognized, the engine control is inhibited even if the theft determination means cannot make a theft determination because it is broken, whereby more reliable prevention of the theft of a vehicle is enabled.

Figure 9:
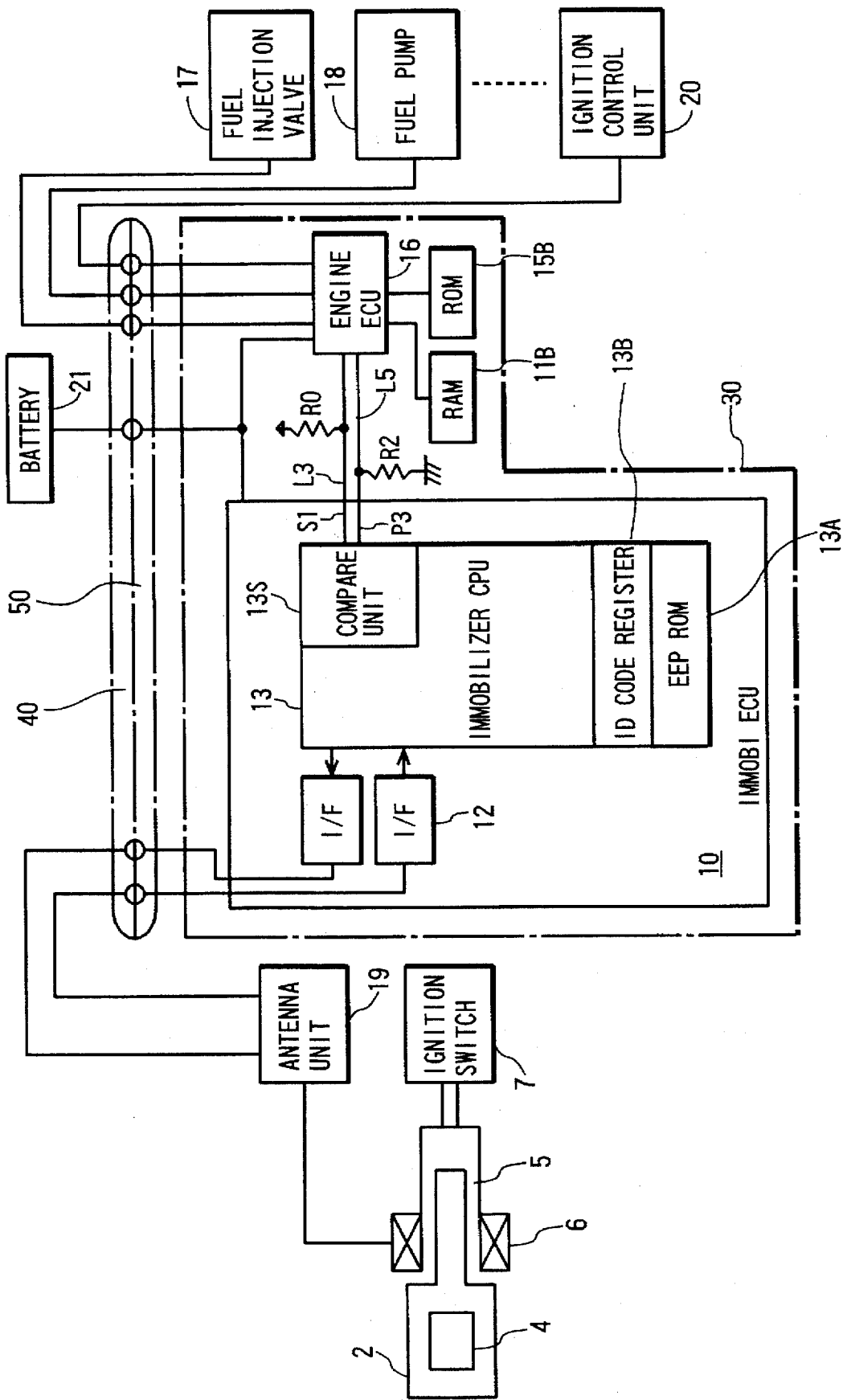
FIG. 9 is a block diagram of the main portions of the third embodiment of the present invention.
Figure 10:
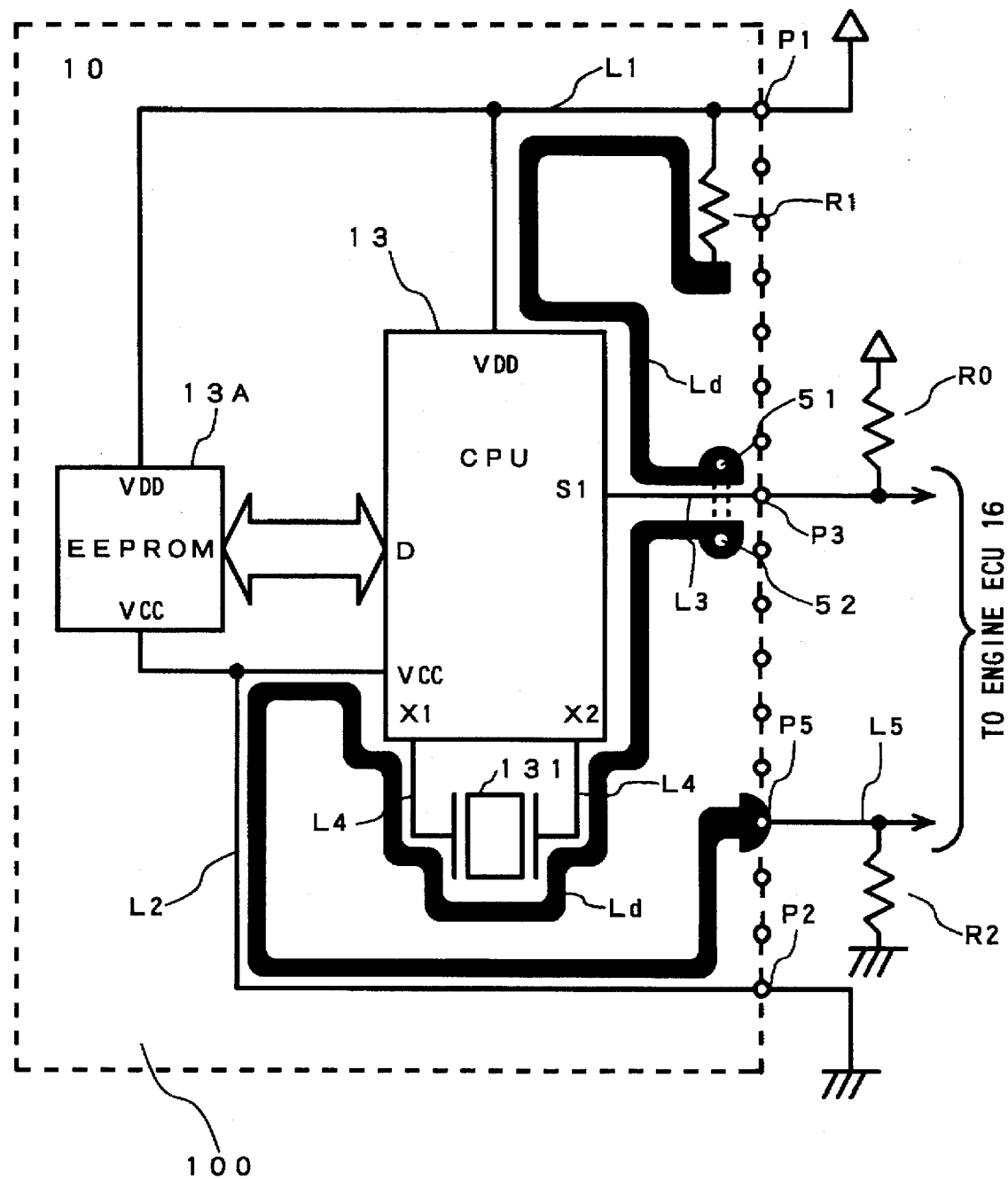
FIG. 10 is a figure showing the circuit board construction on the primary part of the immobilizer 10.

FIG. 9 is a block diagram of the main portions of the third embodiment of the present invention, and FIG. 10 is a figure showing the circuit board construction of the primary part of the immobilizer ECU 10, in which the same symbols as those described above represent the same or identical portions.

In FIG. 10, along those of the various signal lines wired on a substrate 100 of the immobilizer ECU 10, which, if broken, would cause the output at the determination signal output terminal S1 of the immobilizer CPU 13 to be unstable and indefinite, thereby to cause a "H"-level signal to be provided on a determination signal line L3 by the action of a pull-up resistor R0, in other words, along the signal lines which, if intentionally broken by an ill-intentioned third party, could cause the same fault signal as that for the failure of the immobilizer ECU 10 to be outputted from the output terminal S1, a dummy line Ld is wired for detecting a breakage.

More specifically, at least in the vicinity of a power supply line L1 connecting the power supply pin P1 of the immobilizer ECU 10 and its power supply terminal VDD, a ground line L2 connecting a ground earth pin P2 and a ground terminal Vcc, a determination signal line L3 connecting a determination signal output pin P3 and the output terminal S1, and a reference clock line L4 connected to a crystal oscillator 131 for supplying a clock signal to the immobilizer CPU 13, the dummy line Ld for detecting a breakage is wired along the respective lines.

As shown, one end of the dummy line Ld is connected to the power supply line L1 through a pull-up resistor R1. After extending from this end along the power supply line L1 and the determination signal line L3, the dummy line Ld intersects the determination line L3 via through-holes 51 and 52 and the rear surface of the substrate 100 and returns to the substrate surface, and then, after being drawn around the determination line L3, reference clock line L4 and ground line L2, the other end of dummy line Ld is connected to connecting pin P5 of the immobilizer ECU 10. The dummy line connecting pin P5 is connected to the input terminal of the engine ECU 16 by a dummy signal line L5, which is connected to ground potential through a pull-down resistor R2.

If a right ignition engine key is used, or if an illegitimate or a wrong key is used, a pulse signal (verification signal) of a predetermined frequency and duty ratio or a d.c. signal (theft signal) of "L"-level are outputted, respectively, as in the aforementioned embodiments, and thus the engine ECU 16 can make a correct determination by detecting such signals.

The dummy line signal inputted from the dummy signal line L5 to the engine ECU 16 becomes a d.c. voltage of a predetermined level (for instance, 6 V) determined by the resistance values of the voltage dividing resistors R1 and R2 and the power supply voltage value (for instance, 12 V) if the dummy line Ld is not broken. If an ill-intentioned third party attempts to break the signal line by scratching the substrate 100 of the immobilizer ECU 10, the dummy line would also be broken at the same time. As a result, the pull-up resistor R1 does not function at all, so that the dummy line signal is fixed to the "ground" or "L"-level by the pull-down resistor R2. Also, if the whole immobilizer ECU 10 is removed, the dummy signal is fixed to ground potential by the pull-down resistor R2.

Even if a fault signal is detected as a determination signal, the engine ECU 16 makes a theft determination if the dummy line signal is of the "L"-level, and inhibits the engine control.

It is preferable that the dummy line Ld is made thin in thickness or narrow in line width as compared with the other signal lines L1 to L4 so as to more easily be broken than the other signal lines, and that it is disposed as close as possible to the signal lines L1 to L4 in order to make sure that it is also always broken by the action of breaking or cutting the signal lines.

Figure 7:
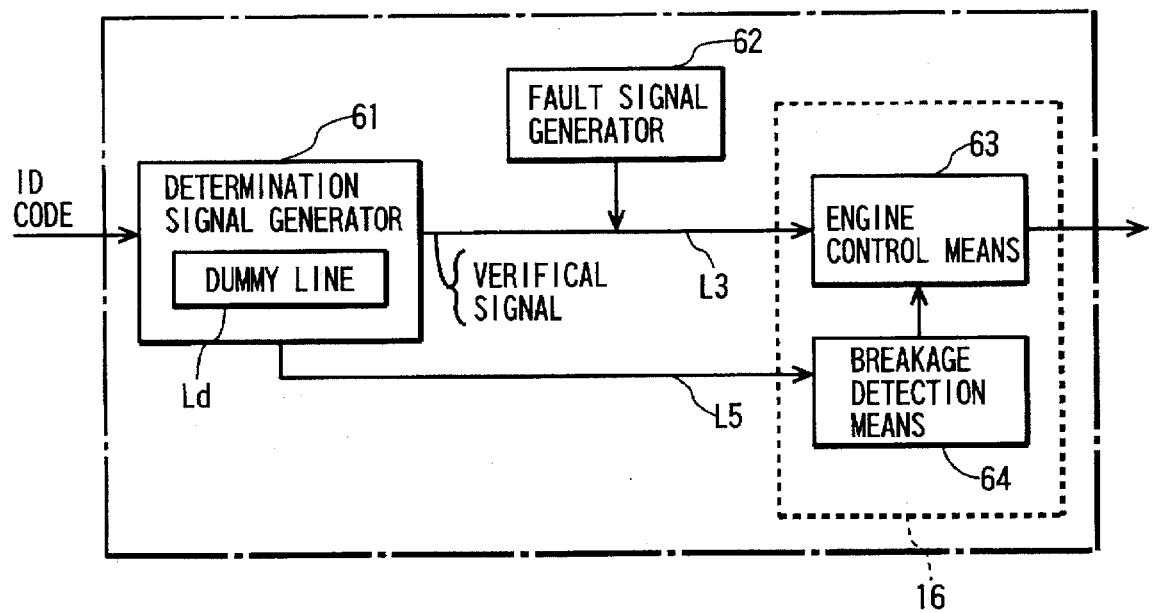
FIG. 7 is a functional block diagram showing the third embodiment of the present invention.
Figure 11:
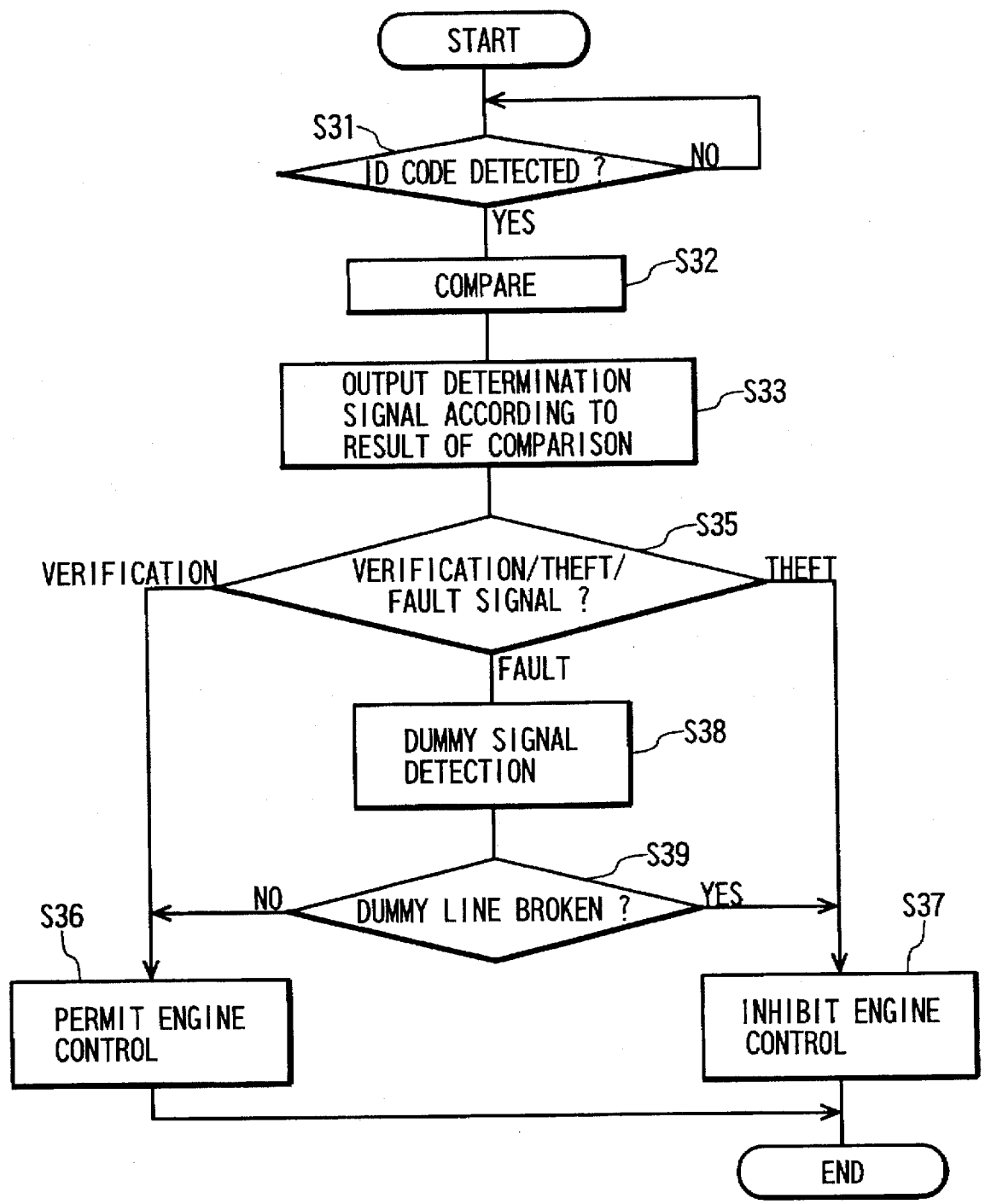
FIG. 11 is a flowchart showing the operation of the third embodiment.

FIG. 7 is a functional block diagram of the third embodiment, and FIG. 11 is a flowchart showing the operation thereof, in which the same symbols as those described above represent the same or identical portions. A determination signal generating means 61 corresponds to one of the functions of the immobilizer CPU 13, and outputs a verification signal or a theft signal on the determination signal line L3 when the externally inputted ID code is valid or invalid, respectively. A fault signal generating means 62 provides the function of pull-up resistor R0, and generates a fault signal on the determination signal line L3 if the determination signal level becomes indefinite.

A breakage detection means 64 is one of the functions of the engine ECU 16, and detects a break in the dummy line Ld. An engine control means 63 is another of the functions of the engine ECU 16, and permits the engine control in response to the verification and fault signals and inhibits the engine control in response to the theft signal, while it inhibits the engine control independently of the determination signal if a break is detected in the dummy line.

If an ID code is detected in the determination signal generating means 61 in step S31 in FIG. 11, then in step S32, it is compared with a prestored reference ID code. In step S33, if the two ID codes match as the result of the comparison, a code signal (verification signal) as shown in the waveform (2a) in FIG. 4 is outputted; otherwise a d.c. signal (theft signal) of the "L"-level as shown in the waveform (2b) in FIG. 4 is outputted. If the output of the immobilizer CPU 13 is indefinite, a d.c. signal (fault signal) of the "H"-level as shown in the waveform (2c) in FIG. 4 is outputted.

In step S35, the type of determination signal is discriminated by the engine control means 63, and if it is a verification signal, the process goes to step S36 to permit the engine control, and if it is a theft signal, the process goes to step S37 to inhibit the engine control. Further, if it is a fault signal, the dummy line signal is detected by the breakage detection means 64 in step S38, and in step S39, it is determined whether or not the dummy line Ld has been open or broken. If it is determined that the dummy line has been broken, the process goes to step S37 to inhibit the engine control; otherwise the process goes to step S36 to permit the engine control.

In accordance with the third embodiment, even if a fault signal is detected, the engine control is not permitted only by this, but it is also determined whether or not the dummy line has been broken. The engine control is permitted if the dummy line has not been broken, whereas the engine control is inhibited if the dummy line has been broken. Accordingly, if the generation of the fault signal is due to breaks in the signal lines L1 to L4 or the like, as in the case in which the immobilizer CPU 13 is intentionally broken, it is determined that an illegal action has been taken and the engine control is inhibited.

Figure 8:
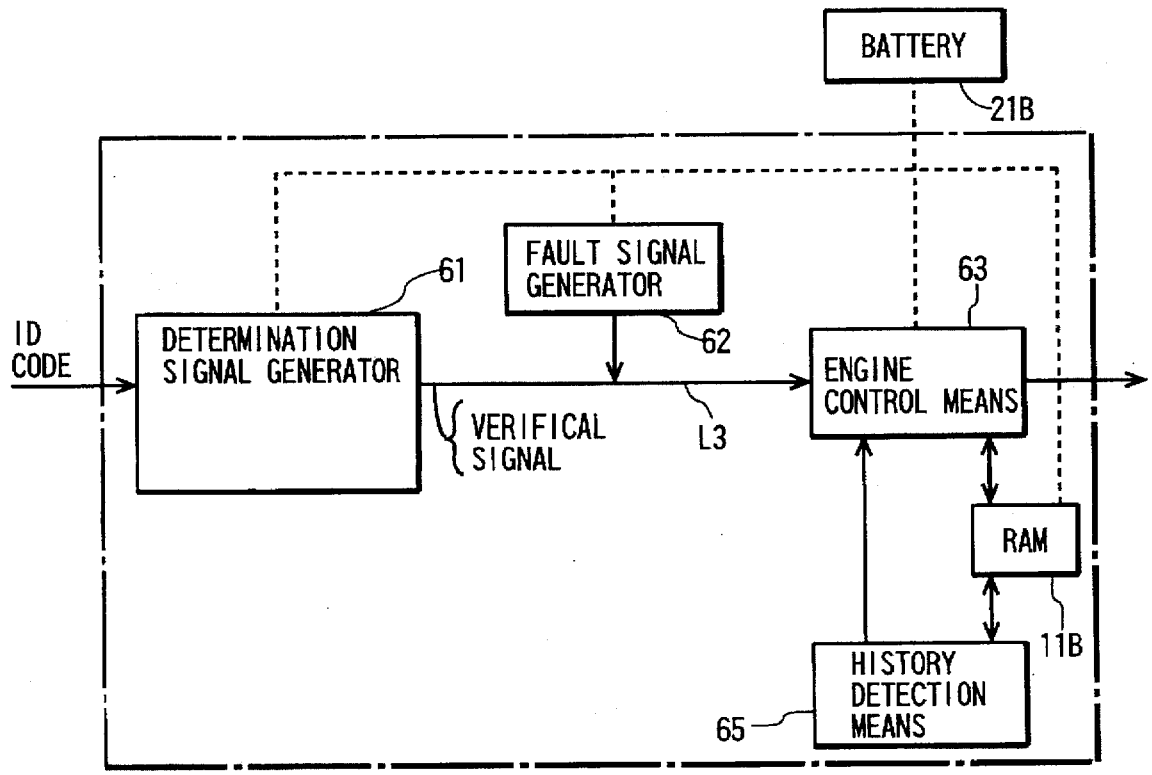
FIG. 8 is a functional block diagram showing the fourth embodiment of the present invention.

FIG. 8 is a block diagram showing the fourth embodiment of the present invention, and FIG. 12 is a flowchart showing the operation thereof, in which the same symbols as those described above represent the same or identical portions (processings).

In general, the immobilizer ECU 10 is contained within the ECU 30, which is located under a driver's or passenger's seat in the vehicle or in the engine compartment or the like. To break the immobilizer ECU 10, works are required for disconnecting the wiring of the ECU 30 (usually provided by a removable connector or the like) and the fitting member to temporarily take the ECU 30 out of the vehicle, and put it back into the vehicle after opening the case of the ECU 30 and breaking the immobilizer ECU 10.

Contained in the engine ECU 16 of the ECU 30 is a volatile memory 11B for storing various learning data and measured data. The volatile memory 11B is backed up by an appropriate power means such as a capacitor so that the stored data is not lost even if the battery voltage is instantaneously interrupted, but the data would be lost in a short time if the power supply from a battery 21 is stopped by disconnecting the wiring of the ECU 30.

In the fourth embodiment, paying attention to the fact that it is necessary to disconnect the ECU 30 from the battery line to break the immobilizer ECU 10, by which the data of the volatile memory 11b must be lost, whether or not the data of the volatile memory 11B has been lost is detected by a history detection means 65, and based on the detection result, whether or not the immobilizer ECU 10 has been broken is determined.

In the process of FIG. 12, a verification signal or a theft signal is detected in steps S31 to S35, as in FIG. 11, and the engine control is permitted or inhibited, respectively. If a fault signal is detected in step S35, then in step S38A, the data detection of the volatile memory 11B is performed by the history detection means 65, and the existence of the data is determined in step S39A. If the data has been lost, the process goes to step S37 to inhibit the engine control, while if it is determined that the data is not lost, the process goes to step S36 to permit the engine control.

In accordance with the fourth embodiment, if a fault signal has been detected, the existence of the data in the volatile memory is determined before a signal for permitting the engine control is outputted. The engine control is permitted if the data is not lost; otherwise the engine control is inhibited. Accordingly, if the generation of the fault signal is due to the disconnection of the ECU 30 from the battery line, as in the case in which the ECU 30 is disconnected from the battery line to break the immobilizer ECU 10, then it is determined that an illegal action was taken, and the engine control is inhibited.

The following advantages are attained by the third and fourth embodiments.

In accordance with the third embodiment, even if a fault signal is detected, a signal for permitting the engine control is not immediately outputted, but it is determined first whether or not the dummy line has been broken. If the dummy line has not been broken, the engine control is permitted; otherwise the engine control is inhibited. Thus, if the generation of the fault signal is due to the breaking of the signal line, as in the case in which the particular system is intentionally broken, then it is determined that an illegal action was taken, and the engine control is inhibited whereby the theft of the vehicle is prevented.

In accordance with the fourth embodiment, even if a fault signal is detected, a signal for permitting the engine control is not immediately outputted, but the existence of the data in the volatile memory is determined. Then, if any data is not lost, the engine control is permitted; otherwise the engine control is inhibited. Accordingly, if generation of the fault signal is due to the disconnection of the particular vehicle anti-theft system from the battery line, as in the case in which a destructive action was taken on the particular system, then it is determined that an illegal action was taken, and the engine control is inhibited to prevent the theft of the vehicle.

What is claimed is:

1. A vehicle anti-theft system comprising:
a theft detection unit for discriminating whether or not a signal supplied to the input thereof is an ID signal representing a right start-up operation, and generating a verification signal if it is a right ID signal, while generating a theft signal if it is not;
a start-up enable signal generating means including an input port connected to said theft detection unit, said start-up signal generating means generating a start-up enable signal when said verification signal is supplied to said input port, said start-up enable signal generating means recognizing that said theft detection unit is not operating normally when neither the verification signal nor the theft signal is supplied to said input port within a predetermined time; and
an engine control unit supplied with said start-up enable signal and responsive to said signal for performing the start-up control of the engine.

2. A vehicle anti-theft system as set forth in claim 1 wherein said start-up enable signal generating means generates a start-up enable signal when it recognizes that said theft detection unit is not operating normally.

3. A vehicle anti-theft system as set forth in claim 2 including means for generating at least one of a display or alarm indicating the failure of the theft detection unit when said enable signal generating means recognizes that said theft detection unit is not operating normally.

4. A vehicle anti-theft system as set forth in claim 1 wherein said verification signal is a pulse having a predetermined cycle and duty ratio, and said theft signal is a d.c. signal of a fixed level.

5. A vehicle anti-theft system as set forth in claim 4 wherein said theft signal is a d.c. signal of one of a reference (ground) level and an operating power source potential.

6. A vehicle anti-theft system as set forth in claim 4 wherein a pull-up resistor is connected to a line connecting the output terminal of said theft detection unit to the input port of the engine control unit.

7. A vehicle anti-theft system comprising:
a theft detection unit for discriminating whether or not a signal supplied to the input thereof is an ID signal representing a right start-up operation, and generating a verification signal if it is a right ID signal while generating a theft signal if it is not, said verification signal being a pulse having a predetermined cycle and duty ratio;
a start-up enable signal generating means including an input port connected to said theft detection unit, said start-up enable generating means generating a start-up enable signal when said verification signal is supplied on said input port;
an engine control unit responsive to said start-up enable signal for performing the start-up control of the engine;
a discrimination timing signal generator for generating a level discrimination timing signal which indicates the timing of the level discrimination of the output signal from said theft detection unit;
signal level sensing means for generating a signal representing the level of the output signal from said theft detection unit at the time of generation of the discrimination timing signal;
means for sensing the level inversion of said output signal; and
a counter for counting the number of the sensed level inversions, and generating an output when the count value reaches a predetermined value, wherein said start-up enable signal generating means generates said engine startup enable signal in response to the output of said counter.

8. A vehicle anti-theft system as set forth in claim 7 further comprising a first timer means for measuring the time interval from a preceding inversion to a current inversion of said output signal, and a means for resetting said counter when said time intervals exceeds a predetermined value.

9. A vehicle anti-theft system comprising:
a theft detection unit for discriminating whether or not the signal supplied to the input thereof is an ID signal representing a right start-up operation, and generating a verification signal if it is a right ID signal, while generating a theft signal if it is not;
a start-up enable signal generating means for generating a start-up enable signal in response to said verification signal; and
an engine control unit supplied with said start-up enable signal and responsive to said signal for performing the start-up control of the engine, while, when supplied with said theft signal, disabling the start-up control of the engine;
timer means for generating a timer signal after the elapse of the predetermined discrimination time during which the output signal from said theft detection unit is discriminated; and
discrimination means for discriminating the input signal to a port connected to said theft detection unit in response to the generation of the timer signal, and activating said start-up enable signal generating means to generate an engine start-up enable signal when said input signal indicates that said theft detection unit is not operating normally.

10. A vehicle anti-theft system as set forth in claim 9 including means for generating at least one of a display or alarm indicating the failure of said theft detection unit when said theft detection unit is not operating normally.

11. A vehicle anti-theft system as set forth in claim 9 further comprising:
a discrimination timing signal generator circuit for generating a level discrimination timing signal which indicates the timing of the level discrimination of the output signal from said theft detection unit;
a signal level sensing means for generating a signal representing the level of the output signal from said theft detection unit at the time of generation of the discrimination timing signal;
a means for sensing the level inversion of said output signal; and
a counter for counting the number of the sensed level inversions, and generating an output when the count value reaches a predetermined value, wherein said start-up enable signal generating means generates said engine start-up enable signal in response to the output of said counter.

12. A vehicle anti-theft system comprising:
a theft detection unit for discriminating whether or not the signal supplied to the input thereof is an ID signal representing a right start-up operation, and generating a verification signal if it is a right ID signal, while generating a theft signal if it is not;
a start-up enable signal generating means for generating a start-up enable signal in response to said verification signal; and
an engine control unit supplied with said start-up enable signal and responsive to said signal for performing the start-up control of the engine, while, when supplied with said theft signal, disabling the start-up control of the engine, a discrimination timing signal generator circuit for generating a level discrimination timing signal which indicates the timing of the level discrimination of the output signal from said theft detection unit;

a signal level sensing means for generating a signal representing the level of the output signal from said theft detection unit at the time of generation of the discrimination timing signal;

a means for sensing the level inversion of said output signal; and a counter for counting the number of the sensed level inversions, and generating an output when the count value reaches a predetermined value, wherein said start-up enable signal generating means generates said engine start-up enable signal in response to the output of said counter.

13. A vehicle anti-theft system comprising:

a theft detection unit for discriminating whether or not a signal supplied to the input thereof is an ID signal representing a right start-up operation, and generating a verification signal if it is a right ID signal while generating a theft signal if it is not;

a start-up enable signal generator including an input port connected to the theft detection unit, said enable signal generating means generating a start-up enable signal when said verification signal is supplied on said input port;

an engine control unit responsive to said start-up enable signal for performing the start-up control of the engine; and a destructive action detection means for detecting a destructive action on said theft detection unit, and generating a destruction signal when a destructive action is detected;

said start-up enable signal generator being inhibited from generating a start-up enable signal when the destruction signal is generated, even if said verification signal is being supplied on said input port.

14. A vehicle anti-theft system as set forth in claim 13 wherein a dummy line is disposed along and in the vicinity of signal lines in said theft detection means, and said destructive action detection means detects a destructive action on the basis of the detection of a break in said dummy line.

15. A vehicle anti-theft system as set forth in claim 13 wherein said destructive action detection means detects a destructive action on the detection of a history of the disconnection of said vehicle anti-theft system from a vehicle battery line.

16. A vehicle anti-theft system comprising:

a determination signal generating means for outputting a verification signal or a theft signal on a determination signal line if an externally inputted ID code is a right ID codes, or is not a right ID code, respectively, a fault signal generation means for generating a fault signal on the determination signal line if a signal level is uncertain on the determination signal line, a dummy line disposed along the signal lines constituting said determination signal generating means so that it is certainly broken if said signal lines are broken, the signal level on the signal line becoming indefinite when said signal lines are broken, a break detection means for detecting a break in said dummy line, and an engine control means for permitting the engine control in response to said verification signal and fault signal, and inhibiting the engine control in response to said theft signal, while for inhibiting the engine control independently of the determination signal when a break in said dummy line is detected.

17. A vehicle anti-theft system as set forth in claim 16 wherein said fault signal generating means is a resistor means for connecting the determination signal line to a fixed potential.

18. A vehicle anti-theft system as set forth in claim 16 further comprising:

a means for connecting one end of the dummy line to a first fixed potential, and a means for connecting the other end of the dummy line through a resistor means to a second fixed potential different from the first fixed potential, wherein said break detection means performs a detection of breakage in the dummy line on the basis of the signal level of the other end of said dummy line.

19. A vehicle anti-theft system as set forth in claim 18 wherein said one end of the dummy line is connected to the first fixed potential through a resistor means.

20. In a vehicle anti-theft system supplied with an operating power through a battery line comprising, a determination signal generating means for outputting a verification signal or a theft signal on a determination signal line if an externally inputted ID code is a right ID codes, or is not a right ID code, respectively, a fault signal generation means for generating a fault signal on the determination signal line if a signal level is uncertain on the determination signal line, an engine control means for permitting the engine control in response to said verification signal and fault signal, and inhibiting the engine control in response to said theft signal, a vehicle anti-theft system further comprising a history detection means for detecting the history of the disconnection of said vehicle anti-theft system from the battery line, wherein said engine control means inhibits the engine control independently of said determination signal when said disconnection history is detected by said history detection means.

21. A vehicle anti-theft system as set forth in claim 20 further comprising;

a volatile memory means for storing engine control data, and a battery means for backing up said volatile memory means, wherein said history detection means references the contents stored in said volatile memory means, and performs a determination that the memory means has a disconnection history when the memory contents has been lost.

22. A vehicle anti-theft system as set forth in claim 16 wherein said verification signal is a pulse having a predetermined cycle and duty ratio.

23. A vehicle anti-theft system as set forth in claim 16 wherein said fault signal is a d.c. signal of a first level, and said theft signal is another d.c. signal of a second level which is different from the first level.

* * * * *